(12) United States Patent
Restuccia et al.

(10) Patent No.: US 8,796,164 B2
(45) Date of Patent: Aug. 5, 2014

(54) MULTILAYER AND COMPOSITION GRADIENT STRUCTURES WITH IMPROVED DAMPING PROPERTIES

(75) Inventors: Carmelo Luca Restuccia, Chester (GB); Emiliano Frulloni, Rossett (GB)

(73) Assignee: Cytec Technology Corp., Wilmington, DE (US)

( * ) Notice: Subject to any disclaimer, the term of this patent is extended or adjusted under 35 U.S.C. 154(b) by 104 days.

(21) Appl. No.: 13/315,631

(22) Filed: Dec. 9, 2011

(65) Prior Publication Data

US 2012/0164907 A1    Jun. 28, 2012

Related U.S. Application Data

(60) Provisional application No. 61/427,776, filed on Dec. 28, 2010.

(51) Int. Cl.
| | |
|---|---|
| *D04H 1/00* | (2006.01) |
| *D04H 3/00* | (2012.01) |
| *D04H 5/00* | (2012.01) |
| *D04H 13/00* | (2006.01) |
| *B32B 5/02* | (2006.01) |
| *B32B 27/04* | (2006.01) |
| *B32B 27/12* | (2006.01) |
| *B32B 27/38* | (2006.01) |
| *B32B 5/06* | (2006.01) |
| *B32B 5/26* | (2006.01) |

(52) U.S. Cl.
USPC ........... 442/361; 442/64; 442/65; 442/172; 442/175; 442/247; 442/251; 442/253; 442/389; 442/390

(58) Field of Classification Search
USPC .............. 442/64–75, 172, 175, 246–248, 442/251–253, 255, 389, 390
See application file for complete search history.

(56) References Cited

U.S. PATENT DOCUMENTS

| | | | |
|---|---|---|---|
| 4,828,910 A | 5/1989 | Haussling | |
| 6,086,984 A * | 7/2000 | DiMaggio et al. | 428/223 |
| 6,156,682 A | 12/2000 | Fletemier | |
| 6,764,754 B1 | 7/2004 | Hunter et al. | |
| 6,953,105 B2 | 10/2005 | Rust et al. | |
| 7,320,739 B2 | 1/2008 | Thompson, Jr. et al. | |
| 8,450,225 B2 * | 5/2013 | Restuccia et al. | 442/172 |

(Continued)

FOREIGN PATENT DOCUMENTS

| | | | |
|---|---|---|---|
| WO | 2007026411 A1 | 3/2007 | |
| WO | 2008147754 A1 | 4/2008 | |
| WO | WO 2009032809 A1 * | 3/2009 | ............ B32B 5/26 |

OTHER PUBLICATIONS

ISR/Written Ipinion for PCT/EP2011/073021 mailed on Feb. 16, 2012.

*Primary Examiner* — Jeremy R Pierce
(74) *Attorney, Agent, or Firm* — Thi D. Dang

(57) ABSTRACT

Composite materials having favorable acoustic and vibration damping properties, while maintaining or improving other composite mechanical properties, include an interleaf layer comprising at least two different nonwoven materials in a specific sequence such that a gradient is formed in the z direction upon curing or an interleaf with a compositional gradient within its structure such that a resin interpenetration gradient is achieved upon curing. Composite materials that contain multilayered nonwoven interleaves are useful, for example, in structures found in aircrafts, such as fuselage skins, stringers and frames. Also contemplated are methods of making the composite material and the structures and aircrafts that contain the composite material.

13 Claims, 5 Drawing Sheets

(56) References Cited

U.S. PATENT DOCUMENTS

| | | |
|---|---|---|
| 2007/0071957 A1 | 3/2007 | Atkins et al. |
| 2008/0004138 A1 | 1/2008 | Webb |
| 2008/0095978 A1 | 4/2008 | Siqueira et al. |
| 2008/0121461 A1 | 5/2008 | Gross et al. |
| 2008/0152854 A1 | 6/2008 | Arellano et al. |
| 2008/0277057 A1 | 11/2008 | Montgomery et al. |
| 2009/0075052 A1 | 3/2009 | Hopf |
| 2010/0170746 A1 | 7/2010 | Restuccia et al. |

* cited by examiner

MULTILAYER AND COMPOSITION GRADIENT STRUCTURES WITH IMPROVED DAMPING PROPERTIES

CROSS-REFERENCE TO RELATED APPLICATION

This application claims benefit of priority from U.S. Provisional Application No. 61/427,776, filed Dec. 28, 2010, which is incorporated by reference herein in its entirety.

BACKGROUND OF THE INVENTION

1. Field of the Invention

Composite materials having favorable acoustic and vibration damping properties, while improving other composite mechanical properties, are disclosed. In particular, composite materials that contain multilayered nonwoven interlayers of nonwoven with a compositional gradient are useful, for example, in structures found in aircrafts, such as fuselage skins, stringers and frames. Also contemplated are methods of making the composite material and the structures and aircrafts that contain the composite material.

2. Description of the Related Art

Fiber-reinforced polymer matrix composites (PMCs) are high-performance structural materials that are commonly used in applications requiring resistance to aggressive environments, high strength, and/or low weight. Examples of such applications include aircraft components (e.g. tails, wings, fuselages, propellers), boat hulls, and bicycle frames. PMCs may comprise layers of fibers that are bonded together with a matrix material, such as a polymer resin. The fibers reinforce the matrix, bearing the majority of the load supported by the composite, while the matrix bears a minority portion of the load supported by the composite and also transfers load from broken fibers to intact fibers. In this manner, PMCs may support greater loads than either the matrix or fiber may support alone. Furthermore, by tailoring the reinforcing fibers in a particular geometry or orientation, the composite can be efficiently designed to minimize weight and volume.

Numerous processes have been developed for the manufacture of PMCs. Examples may include wet layup, prepregging, and liquid infusion. In wet layup, the reinforcing fiber is wet with the matrix material, placed into a mold cavity, and allowed to harden or cure. This process may be performed in an automated fashion, such as with a chopper gun or a machine that receives dry fiber rolls, runs them through a resin dip bath, and places the wetted fibers in the mold. Alternatively, the resin may be applied manually using brushes.

In prepregging, composite components are fabricated with pre-impregnated woven fabrics or prepregs. The reinforcing fibers are impregnated with the matrix resin in a controlled fashion and frozen in order to inhibit polymerization of the resin. The frozen prepregs are then shipped and stored in the frozen condition until needed. When manufacturing composite parts from prepregs, the prepregs are, thawed to room temperature, cut to size, and placed in the mold cavity. Once in place, the prepregs are vacuum bagged and cured under pressure to achieve the required fiber volume fraction with a minimum of voids.

The use of advanced composite materials has gained wide acceptance over the last few decades because of their high strength-to-weight and stiffness-to-weight ratios. Advanced composite materials show higher stiffness but inferior damping performance and compared with metals and metal-matrix composites. Thus, there is a need for advanced composite materials having an enhanced damping capacity of a composite structural system with little reduction in stiffness and strength.

U.S. application Ser. No. 12/683,105 (Publ No. 20100170746), which is issued to the same assignees as the present application, is directed to a composite material comprises a nonwoven layer having a viscoelastic interleaf, which may be positioned mid-ply therein. Although this material has improved acoustic and vibrational damping properties over the conventional materials there is a need in the industry for a material with acoustic and vibrational damping properties and concomitantly improved composite mechanical properties such as delamination strength to advance the technology and satisfy customers. In addition it would be useful if the acoustic and vibrational damping properties could be achieved without plasma treatment, which is a complex, expensive and potentially aggressive treatment that may have a potentially detrimental effect on other mechanical properties.

SUMMARY OF THE INVENTION

These and other properties are achieved by novel compositions herein, which include cured or uncured structural composite material, and cured or uncured composite sandwich structural material.

In some embodiments, a cured or uncured structural composite material comprises a structural component, such as carbon fibers; a resin component; and an interlayer comprising at least two types of nonwoven material in one or more nonwoven layers; wherein the structural component is in a form of a plurality of layers of textile that comprises structural fibers; wherein the interlayer comprising at least two types of nonwoven material in one or more nonwoven layers is positioned between a pair of adjacent layers of the textile; wherein a first type of nonwoven material comprises a core portion of the interlayer and wherein a second type of nonwoven material comprises outer portions of the interlayer on either side of a core portion; and wherein upon curing the interleaf comprises a resin interpenetration gradient between the nonwoven material in the core and outer portions in the z direction in the structural composite material.

In some embodiments, a cured or uncured composite sandwich structural material comprises a first skin and a second skin, wherein the first skin and the second skin comprise a plurality of layers of textile; a structural core between the first skin and the second skin; a resin component; and an interleaf comprising at least two types of nonwoven material in one, or more nonwoven layers; wherein a first type of nonwoven material comprises a core portion of the interlayer and wherein a second type of nonwoven material comprises outer portions of the interlayer on either side of the core portion; and wherein upon curing the interleaf comprises a resin interpenetration gradient between the nonwoven material in the core and outer portions in the z direction in the structural composite material; and wherein:
 a) the interleaf is positioned between one skin and the structural core;
 b) the interleaf is positioned between two adjacent layers of textile in the skin; or
 c) the interleaf is positioned between one skin and the structural core, and a second interleaf is positioned between two adjacent layers of textile in the skin.

Further, a composition may comprise a resin component; and an interleaf comprising at least two types of nonwoven material in one or more nonwoven layers; wherein a first type of nonwoven material is in a core portion of the interlayer and wherein a second type of nonwoven material is on outer portions of the interlayer on either side of a core portion; wherein upon curing the interleaf comprises a resin interpenetration gradient between the nonwoven material in the core and outer portions in the z direction in a structural composite material.

In some aspects, upon curing the outer portions of the interleaf are more interpenetrated with the resin component than the core portion.

In some aspects, the interleaf comprises at least three layers of nonwoven material; wherein the core portion comprises a layer of the first type of nonwoven material; wherein the outer portions are outer layers of the second type of nonwoven material; and wherein the core layer is positioned between the outer layers. However, a single layer is also contemplated wherein the interleaf comprises one layer of nonwoven material having a compositional gradient; and wherein the compositional gradient progressively varies from the core portion to the outer portions of the interleaf. The nonwoven material may be partially or totally pre-impregnated with the resin component before curing. In addition, the surface of the interleaf maybe pre-treated to further improve the adhesion of the interleaf to the structural component. Preferably, the nonwoven material comprises at least one thermoplastic elastomer or a blend thereof; and at least one thermoplastic polymer or copolymer and/or a blend thereof. The thermoplastic elastomer may comprise at least one copolymer selected from the group consisting of styrenic thermoplastic elastomers, polyolefin based thermoplastic elastomers and a blend thereof. The thermoplastic may be selected from the group consisting of polyesters, polyamides, polyolefins, one of their copolymers and a blend thereof.

The interleaf may further comprise organic and inorganic compounds or fillers.

The resin component may be a thermosetting composition.

The interleaf may be embedded in the resin component prior to the curing process.

These and other embodiments are disclosed herein.

DETAILED DESCRIPTION OF THE PREFERRED EMBODIMENT

Figure 1:
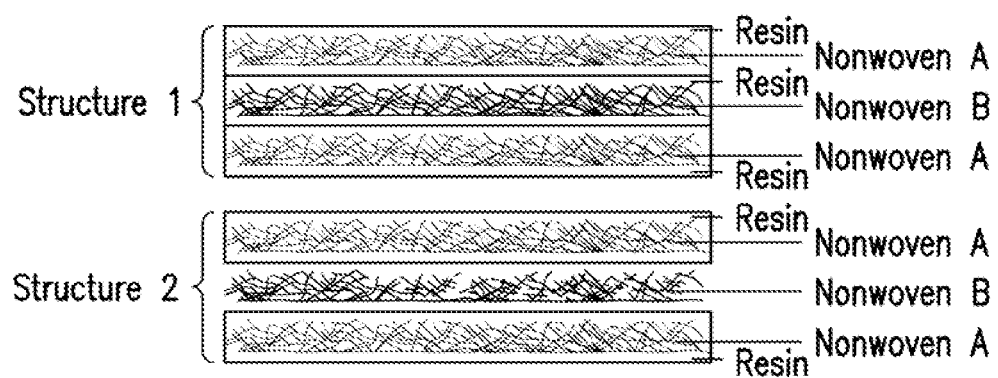
FIG. 1 depicts embodiments of multi-layer structures described herein. Structure 1 illustrates an embodiment wherein the nonwoven layers are totally pre-impregnated with resin. Structure 2 illustrates an embodiment wherein the nonwoven layers are partially pre-impregnated with resin.

High damping performance can be obtained while further improving other composite mechanical properties such as delamination strength by using a nonwoven multilayer veil or an interleaf having compositional gradient as part of a composite material. In some aspects, nonwoven materials in a sequence are sufficiently similar to prevent material incompatibility between the layers or portions of an interleaf, such as between a core position or layer and adjacent outer portions or layers, but at the same time sufficiently differ so that outer portions or layers have better resin interpenetration in comparison to an adjacent core portions or layer upon curing. Such a sequence forms a peculiar interlaminar morphology having a combination of advantageous properties, which are otherwise difficult to achieve simultaneously when a single nonwoven material is used, or when an undesirable sequence of layers is used.

These properties are important in the aerospace industry, which has a focus to enhance the performance of its products leading to a constant increase in the use of advanced composite materials for aircraft primary and secondary structures.

The main advantages of composites in aircraft design are their high strength-to-weight ratio, excellent fatigue endurance, corrosion resistance and flexibility allowing a significant reduction of components part count and the need for fasteners and joints.

However, composite materials stiffness results in an inferior efficiency in attenuating noise, vibration and the resulting fatigue on the structure if compared to metals.

Standard solutions to improve the acoustic performance include the use of passive, semi-active or active control techniques.

One common mechanism used to address vibration/noise problems in composite structures is based on viscoelastic damping. In this case, a large number of unconstrained or constrained "add on" devices must be applied to the emitting/vibrating surface. In the first case a damping layer is directly bonded to the vibrating surface dissipating energy through a series of cyclic tension/compression deformations, along with the bending of the structure. In the second case a viscoelastic/elastomeric layer combined with a constraining composite/metal layer is bonded to the emitting surface promoting the dissipation of vibrational/acoustical strain energy into heat through a cyclic shear deformation mechanism.

Multilayer add-on sound absorptive materials have been used for automotive interiors applications to provide, enhanced noise reduction and cruise comfort. Different combinations of viscoelastic continuous, films, cores, foams and nonwoven fabrics with different composition, thickness, weight, acoustic performance and manufacturability were developed for these applications. Structures containing a sequence of air-impermeable barrier, air-permeable reinforcing cores, air-permeable open cell foams, fibrous pads and semi-permeable airflow-resistive membranes were disclosed to improve car interiors acoustic performance (U.S. Pat. No. 7,320,739A2). Light sound absorbing materials comprising a plurality of layers composed by a rigid surface membrane material layered on one side of an organic fiber nonwoven fabric layer and attached to a car body part interposing an air layer between the last two layers have been presented (WO2007/026411A1). An adhesive layer is usually applied onto the surface of the damping films toward the part to be damped to promote the device positioning and all-over surface gluing. Multilayer add-on damping foils containing a series of perforated, porous and continuous films (U.S. Pat. No. 6,953,105 B2) to improve the damping performance and the adhesion to car body and roof panels were disclosed. Solutions including anchoring fiber supported thermoplastic films and combined with adhesive films were also developed (US 2008/0152854 A1). US 2009/0075052 A1 describes an adhesive tape for thermal welding comprising a bonded polymeric substrate coated with an acrylate or natural rubber based pressure sensitive adhesive mixed with fibers. Complex architectures comprising a specific sequence of elastic films and nonwovens have been extensively used for textile, clothes and diapers applications to improve aesthetic and hand-feel properties while maintaining the product flexibility and fit-ability (US 2008/004138) or showing latent stretch-ability (US 2008/0095978).

Recently a second approach based on the use of interlaid co-cured viscoelatic films into the composite laminate was developed to minimize the effect of noise and fatigue. US2007/0071957, for instance, discloses the use of structural composite materials containing a plurality of fibrous material embedded in a structural matrix material and containing in between them damping perforated films. Composite laminate structures including fiber prepregged with a thermosetting resin matrix above its Tg (in the viscoelastic state) (US 6764754) or co-cured fiber supported viscoelastic films (US2008/0277057) were also disclosed.

An alternative solution based on the use of a composite structure comprising a matrix material and a plurality of shape memory alloy wire fibers was also presented (WO 2008/147754).

U.S. application Ser. No. 12/683,105 (Publ No. 20100170746) is directed to a composite material comprising a nonwoven layer having a viscoelastic interleaf, which may be positioned mid-ply therein.

Although standard material solutions can partially improve composites damping performance they still show substantial limitations in terms of cost, weight, mechanical performance and manufacturing processes flexibility/suitability. The chemical nature (mainly vulcanized elastomers) and product form (mainly continuous films) of the state of the art materials limits their application to infusion or automated fiber placement processes. Most of 'add-on' dampers must be manually applied to the emitting surface, resulting in additional installation, labor and maintenance costs. Therefore, there is still a strong need for a material solution overcoming most of the technical and cost limitations, which can be integrated in composite structures using current manufacturing processes and that can be easily tailored to specific applications.

In some embodiments, the integration in specific areas of a composite structure (such as mid-ply therein) of a multilayer nonwoven material forms a controlled interlaminar structure during the curing cycle resulting in a resin interpenetration gradient in the z direction. The z direction is commonly understood in the nonwoven art and includes an "out-of-plane" direction generally, or perpendicular to the planes of the various layers in a structural composite material. Such an integration of a multilayer nonwoven material can result in a substantial improvement in its noise/vibration attenuation while maintaining or improving its mechanical properties. In some aspects, the interlayer has a plurality of adjacent layers wherein the nonwoven material used in two adjacent layers are sufficiently similar to be compatible yet are sufficiently different so that the resin interpenetration level for each material results in favorable damping and mechanical properties upon curing. For instance, these properties may be achieved by using outer layers having a better resin interpenetration level upon curing in comparison to a core layer in between the outer layers. In some embodiments, during the cure cycle, the composition, thickness and air-permeability of nonwoven outer layers allow more resin to penetrate the nonwoven multi-veil structure due to its ability to retain its shape and limit the swelling of the nonwoven material, such as microfibers. In contrast, the core layer will have a slightly different composition and air permeability in which it is capable of allowing a more accentuated and controlled swelling of the nonwoven material (such as microfibers) thus slightly reducing the space available for the resin to interpenetrate. By controlling the resin interpenetration in the structure by using different nonwoven material and by using the materials in a particular sequence, superior interlaminar strength and damping properties are achieved. Thus, a structure in which outer portions containing interpenetrated areas containing more resin, in comparison to the core, results in excellent damping and mechanical performance. This effect may also be achieved by a single layer material having a compositional gradient in the z direction. In contrast, a structure with a high permeable core that is interconnected to high permeable outer layers, will not achieve as favorable damping and interlaminar strength properties. In configuration 2 shown in Table 2 below, the same veil grade is used allowing higher resin interpenetration levels for the three layers of the multiveil structure. In this case, a uniform resin interpenetration in the z direction of the multiveil structure results. The peculiar morphology achieved in aspects of the invention cannot be created upon curing and this configuration results in inferior damping and mechanical properties. Thus, configuration 2 is reported in the example to illustrate that if three random materials with the same composition are used the peculiar morphology achieved in aspects of the invention is not created.

In some embodiments, the core layer or core portion creates a nearly continuous network with the other layers or portions due to the effect of controlled swelling and interpenetration at the interface between the nonwoven materials (such as microfibers) in the adjacent layers or portions. In some aspects, this behavior is due to be very limited difference in the composition between the layers or portions, which prevent material incompatibility issues.

Thus, both the composition and physical parameters of the various non-woven materials used, and the specific sequence in which the non-woven layers or interlayer portions are placed, can determine the resin content upon curing, the effect on damping, and mechanical performance of the resulting composite material.

Materials may be readily tested by one skilled in the art to compare resin interpenetration and compatibility between various nonwoven materials.

Compatible nonwoven compositions may be characterized by reduced levels of interfacial tension and high interfacial adhesion in the solid state as effects of covalent, ionic, intermolecular, dipole-dipole, ion-dipole, H-bonding or van der Waals forces. In some aspects, compatible nonwoven compositions do not grossly phase separate into their individual components during the curing cycle and do not lose useful technological properties in the composite operational conditions. Various thermal, scattering, spectroscopic, microscopic, chromatographic and interfacial techniques can be used to assess the compatibility level of different nonwoven compositions. The choice of the characterization technique is mainly driven by the nonwoven compositions and type of interaction between the different blends constituent polymers.

Nonwoven air permeability values can be measured according to ASTM D737-04 (2008). Nonwoven layers having high air permeability values (such as $\geq 70$ cc/cm2/s) can be used for the outer nonwoven layers of the multiveil structure or for the outer portions of the veil having a compositional gradient in the z direction within its structure. Nonwoven layers having low air permeability values (such as <70 cc/cm$^2$/s) may be used for the core nonwoven layer of the disclosed multilayer structure or for the central portion of the nonwoven with having a compositional gradient in the z direction and within its structure.

Optimal levels of air permeability are usually selected based on the nonwoven composition, microfibers swelling factor, resin composition and curing cycle.

Nonwoven swelling behavior and resin interpenetration levels can be observed and quantified by analysing a small portion of impregnated or partially impregnated nonwoven using an optical microscope equipped with a hot-stage system and reproducing the curing cycle conditions. Nonwoven constituted by microfibers which minimally (less than the 50% of their initial volume) or do not swell in the resin system are suitable for the outer nonwoven layers of the multiveil structure or for the outer portions of the veil having a compositional gradient in the z direction within its structure Nonwovens constituted by microfibers which swell more than the 50% and more specifically between the 50 and 200% of their initial volume can be used for the core nonwoven layer of the disclosed multilayer structure or for the central portion of the nonwoven with having a compositional gradient in the z direction and within its structure.

The multilayer veil and resin combination can be easily fabricated ensuring several degrees of flexibility to satisfy any shape, architecture and specification requirement (layers composition, fiber diameter, weight, thickness, air/resin permeability and mechanical properties). Different architectures and layer sequences can be developed to fulfill specific temperature and frequency damping requirements. The material is suitable for most composites manufacturing processes including infusion and automated fiber placement. The use of multilayer and composition gradient structures can result in a significant reduction of the part count, weight, structure complexity and labor/installation/maintenance costs. The material can be integrated during fuselage skin/frames/stringers manufacturing with no need for additional steps. The solution can be easily applied only to specific areas of the structure further contributing to the damping efficiency and weight saving. Enhancing the sound attenuation performance of composite structures further cost and weight reductions are expected due to the size and weight reduction of the secondary damping treatments installed between the skin and the interior panels.

Thermoplastic elastomers and blends thereof in combination with thermoplastic polymers, copolymers or blends thereof were proved to provide a good balance between, process ability, cost and thermo-mechanical properties in acoustic damping applications. Engineered nonwovens can be integrated in selected areas of composite structures to improve their noise and vibration damping performance. Parameters such as composition, air permeability; A/W, fiber diameter and thickness can be finely tuned to achieve adequate/desired levels of resin interpenetration and thus high peel strength values and cohesive failures. Conversely high resin contents in the interleaf structure can limit laminate damping potential.

Interleaved continuous elastomeric films as standalone or in combination with adhesives can improve composite acoustic performance. The inherent nature of the materials used (mainly vulcanized rubbers) limit their adhesion to the adjacent layers greatly reducing the mechanical performance and their potential use for aircraft structural components and structures.

Aspects of the solutions described herein that are created during the curing cycle of a controlled structure with a resin interpenetration gradient in the z direction can maximize both damping and peel strength performance of interleaved composites while maintaining or improving their mechanical properties.

The terms "approximately," "about," and "substantially" as used herein represent an amount close to the stated amount that still performs the desired function or achieves the desired result. For example, the terms "approximately", "about" and "substantially" may refer to an amount that is within less than 10% of, within less than 5% of, within less than 1% of, within less than 0.1% of, and within less than 0.01% of the stated amount.

The term "partially" or "at least a portion of" as used herein represents an amount of a whole that comprises an amount of the whole that may include the whole. For example, the term "a portion of" may refer to an amount that is greater than 0.01% of, greater, than 0.1% of, greater than 1% of, greater than 10% of, greater than 20% of, greater than 30% of, greater than 40% of, greater than 50% of, greater than 60%, greater than 70% of, greater than 80% of, greater than 90% of, greater than 95% of, greater than 99% of, and 100% of the whole.

The term "integrated" as used herein has its ordinary meaning as known to those skilled in the art and refers to damped structures that contain a combination of elements in a structure that functions cooperatively and in which any element is an intimate part of the main structure and is not easily separable, and in one aspect cannot be in any way separated. In some embodiments, an integrated damped structure includes composites that are co-cured with the nonwoven damping material. In other embodiments, the resin component penetrates the nonwoven material partially or substantially completely. Thus, the structural resin composition is continuous or partially continuous throughout the composite structure. Upon heating, a partial diffusion and intermingling of the interleaf within the resin matrix can be obtained further improving the strength of the final composite and to form an integrated structure.

The term "co-cured" as used herein has its ordinary meaning as known to those skilled in the art and includes material that is cured in a single step. For example, a prepreg having an interleaf partially or completely impregnated with resin may be co-cured or cured in a single step. In some embodiments, co-curing the interlayer having the nonwoven material with the remainder of the components in the composite material results in an integrated structure.

The nonwoven material can be used for different manufacturing processes. The nonwoven material may also be used to make prepregs. In one embodiment, the nonwoven material and the fiber or preform may be infused with resin simultaneously or during the same infusing process yielding an integrated structure. In this embodiment, the layer is not a continuous film or a partially continuous film acting as a flow barrier that is embedded in a structure.

The term "structural component" as used herein has its ordinary meaning as known to those skilled in the art and includes a material comprising structural fibers and which is in the form of a plurality of layers of textile, such as woven carbon fiber fabric.

The term "structural fiber" as used herein includes fibers which add to the strength of the ultimate composite such as glass or carbon fibers and which therefore have a modulus of elasticity greater than 50 GPa.

The term "resin component" as used herein has its ordinary meaning as known to those skilled in the art and includes a structural resin composition suitable for making fuselage skins, stringers and frames.

The terms "matrix," "resin," and "matrix resin" as used herein have their ordinary meaning as known to those skilled in the art and may include one or more compounds comprising a thermoset and/or thermoplastic materials. Examples may include, but are not limited to, epoxies, epoxy curing agents, phenolics, phenols, cyanates, imides (e.g., polyimides, bismaleimide (BMI), polyetherimides), polyesters, benzoxazines, polybenzimidazoles, polybenzothiazoles, polyamides, polyamidimides, polysulphones, polyether sulphones, polycarbonates, polyethylene terephthalates, and polyether ketones (e.g. polyether ketone (PEK), polyether ether ketone (PEEK), polyether ketone ketone (PEKK) and the like), combinations thereof, and precursors thereof.

Beneficially, the use of an integrated damped structure results in a significant weight savings of the damping element, and reduces maintenance costs, parts count and labors costs. In addition, the reduction in noise may result in further weight and cost savings by minimizing secondary damping treatments used in an aircraft fuselage, such as oversized glass wool blankets, trimmings, and other installation devices.

The terms "damped" or "damping" as used herein has its ordinary meaning as known to those skilled in the art and includes the dissipation of mechanical energy of a vibrating structure. Energy dissipation may include conversion of mechanical energy into thermal energy which is then lost to a structure's environment. In one embodiment, damping is passive-based material damping. In one embodiment, the composite laminate shows high damping properties, for example, a high loss factor, η, over a wide range of frequencies and temperatures. Suitable frequencies include about 200-5000 Hz. Suitable temperatures include about −50° C. to +20° C., such as −40° C. to +10° C., −30° C. to +20° C., −20° C. to +10° C. −10° C. to +20° C., or 0° C. to +10° C.

The term "prepreg" as used herein has its ordinary meaning as known to those skilled in the art such as described above. Prepregs include sheets or lamina of fibers that have been impregnated with a matrix material within at least a portion of their volume. The matrix may be present in a partially cured state. In one embodiment, the prepreg has a fiber volume fraction between about 0.50 to 0.60 vol. %, on the basis of the total volume of the prepreg.

The terms "cure" and "curing" as used herein have their ordinary meaning as known to those skilled in the art and may include polymerizing and/or cross-linking processes. Curing may be performed by processes that include, but are not limited to, heating, exposure to ultraviolet light, and exposure to radiation. In certain embodiments, curing may take place within the matrix. Prior to curing, the matrix may further comprise one or more compounds that are, at about room temperature, liquid, semi-solid, crystalline solids, and combinations thereof. In further embodiments, the matrix within the prepreg may be partially cured in order to exhibit a selected stickiness or tack.

The term "composites" as used herein each has its ordinary meaning as known to those skilled in the art such as described above. Composites may include plurality of prepregs. Prepregs may be consolidated into composites by applying at least one of heat, vacuum, and external pressure. The resulting composites can be used in (but not limited to) aerospace applications.

Embodiments of the composites described herein have an apparent interlaminar shear strength that is not substantially affected by the solvent methyl ethyl ketone (MEK) conditioning. In some embodiments 90% of this shear strength is retained after MEK conditioning, e.g., 90%, 91%, 92%, 93%, 94%, 95%, 96%, 97%, 98%, 99%, or 100%.

The phrase "shear strength" as used herein has its ordinary meaning as known to those skilled in the art. Specimens may be tested in shear in a variety of ways. In one embodiment, the apparent shear strength is the maximum shear stress calculated at half thickness of a test specimen at the moment of first failure and may be measured through flexure, such as 3-point bending. The shear strength in 3-pt bending may be given by $$\tau = \frac{3 \cdot P_R}{4 \cdot b \cdot h}$$

wherein $P_R$ is the maximum force at the moment of the first failure, b is the width of the specimen, and h is the thickness of the specimen.

The term "fiber" as used herein has its ordinary meaning as known to those skilled in the art and may include one or more fibrous materials adapted for the reinforcement of composites. Fibers may take the form of any of particles, flakes, whiskers, short fibers, continuous fibers, sheets, plies, and combinations thereof. Continuous fibers may further adopt any of unidirectional, multi-dimensional (e.g. two- or three-dimensional), non-woven, woven, knitted, stitched, wound, and braided configurations, as well as swirl mat, felt mat, and chopped mat structures. Woven fiber structures may comprise a plurality of woven tows having less than about 1000 filaments, less than about 3000 filaments, less than about 6000 filaments, less than about 12000 filaments, less than about 24000 filaments, less than about 48000 filaments, less than about 56000 filaments, less than about 125000 filaments, and greater than about 125000 filaments in further embodiments, the tows may be held in position by cross-tow stitches, weft-insertion knitting stitches, or a small amount of resin, such as a sizing.

The composition of the fibers may be varied, as necessary. Embodiments of the fiber composition may include, but are not limited to, glass, carbon, aramid, quartz, polyethylene, polyester, poly-p-phenylene-benzobisoxazole (PBO), boron, silicon carbide, polyamide, and graphite, and combinations thereof. In one embodiment, the fiber is carbon, fiberglass, aramid or other thermoplastic materials. The reinforcing fibers may be organic or inorganic. Further, the fibers may include textile architectures including those that are either continuous or non-continuous in form.

The term "nonwoven" as used herein has its ordinary meaning as known to those skilled in the art and may include a fibrous, self-bonding web that is not woven. In one embodiment, "nonwoven" refers to any material which has been formed without the use of textile weaving processes that produces a structure of individual fibers that are interwoven in an identifiable manner. The nonwoven fabric can be made from short or long fibers. Nonwoven material may be suitable for resin infusion processes as the nonwoven material allows the resin to flow due to the controlled permeability of the nonwoven. In contrast, continuous or perforated VEM films create a physical barrier to resin flow. Nonwoven materials include wet-laid, dry-laid (carded, airlaid), spunmelt (spun-laid, meltblown), flash spun, electrostatic spun, water-jet-punched, needle punched structures.

Representative polymers for the nonwoven include a) at least one thermoplastic elastomer or a blend thereof and b) one thermoplastic polymer or copolymer and/or blend thereof.

Some embodiments of thermoplastic elastomers include styrenic thermoplastic elastomers containing polybutadiene, polyisoprene, hydrogenated polybutadiene, hydrogenated polyisoprene or a combination thereof, polyolefin-based thermoplastic elastomers, halogen-containing polyolefinic thermoplastic elastomers, polyurethane thermoplastic elastomers, polyamide polyether copolymers, copolyester thermoplastic elastomers, polyacrylate based thermoplastic elastomers and blends thereof. In some embodiments, a styrenic thermoplastic elastomer such as a copolymer containing hydrogenated ethylene-propylene flexible units (SEPS) and styrenic hard blocks, such as Kuraray Septon 2063 or Kraton FG1924X, or hydrogenated ethylene-butadiene flexible units (SEBS) and styrenic hard blocks such as Polimeri Europa Europrene or Alpha Gary Evoprene may be selected as main component for the nonwoven layers formulation.

Some embodiments of thermoplastic polymer or copolymer include: polyesters such as polyethyleneterephthalate (PET), polybuthyleneterephthlatate (PBT), copolyesters or blends thereof; polyatnides such as nylon 6 or nylon 66, polyarylamides, poly amide imides; Olefinic polymers such as low, medium and high density polypropylene, low, medium and high density polyethylene, atactic, sindiotactic or isotactic polypropylene and blends thereof, polyethylene vinyl alcohol and blends thereof, poly(1-butene), poly(2-butene), poly(3-methyl-1-butene), poly(4-methyl-1-pentene), poly(1-hexene), poly(1-heptene), poly(1-octene), poly (1-nonene), poly(1-decene), poly(1-dodecene); poly(1-tetradecene), poly(1-hexadecene), poly(1-octadecene), copolymers and blends thereof; olefinic copolymers and blends thereof; vinyl polymers and copolymers such as polyvinylchloride, polyvinylidene chloride, polyvinylalcohol and polyethylenevinylacetate, acrylic polymers and copolymers; polyurethanes and other polymers now known or later developed and blends thereof.

In some embodiments, different percentages of Polypropylene (PP) and of a high Tm polyolefin, for example a 4 Methyl-1 Pentene copolymer commercially available from Mitsui Chemicals in different grades with the trade name of TPX®, may be compounded with the selected thermoplastic elastomer to form one of the nonwoven materials in the multilayer structure.

In some embodiments, the ratio of the thermoplastic elastomer(s) to thermoplastic polymer(s)/copolymer(s) is about 95:5 to 5:95, such as 10:90, 15:85, 20:80, 25:75, 30:70, 36:65, 40:60, 45:55, 50:50, 55:45, 60:40, 65:35, 70:30, 75:25, 80:20, 85:15, or 90:10, by weight such as 40:60 or 30:70, depending on the desired temperature/frequency damping and themo-mechanical properties of the resulting composite material. In some aspects, the ratio of thermoplastic elastomer(s) to thermoplastic polymer(s)/copolymer(s) is 70:30 by weight. For example, a thermoplastic elastomer such as hydrogenated ethylene-propylene flexible units (SEPS) and styrenic hard blocks, such as Kuraray Septon 2063 may be present in a nonwoven material in an amount of 70% by weight. In some embodiments, thermoplastic polymer may be present in a nonwoven material in an amount of 30% by weight, such as polypropylene (PP). In other aspects, a thermoplastic polymer and a thermoplastic copolymer together may be present in a nonwoven material in amount of 30% by weight, such as PP and a 1-pentene copolymer, such as 4 methyl-1 pentene-1 decene. In another embodiment, a thermoplastic elastomer (70% w/w) can be modified using the 30% w/w of a 4-Methyl 1-pentene copolymer such as 4 methyl-1-pentene-1 hexadecene-1octadecene copolymer.

In some embodiments, the ratio of the thermoplastic polymer(s) to thermoplastic copolymer(s) may range from 0:100 to 100:0, such as 5:95, 10:90, 15:85, 20:80, 25:75, 30:70, 36:65, 40:60, 45:55, 50:50, 55:45, 60:40, 65:35, 70:30, 75:25, 80:20, 85:15, 90:10 or 95:5, such as 70:30, 60:40, 50:50, 45:55, 55:45, 60:40, 40:60, or 30:70 of the thermoplastic polymer(s) to thermoplastic copolymer(s) by weight depending on the desired properties of the resulting composite material as would be readily apparent to a skilled artisan. In some aspects, a thermoplastic polymer such as polypropylene (PP) and thermoplastic copolymer such as one having a high Tm polyolefin, for example a 1-pentene copolymer, such as 4 methyl-1 pentene-1 decene copolymer, may be used in a ratio of 50:50 by weight.

Thus, depending on factors such as: the composition of the interlayer such as each layer's composition and physical properties; the resin system; and the cure cycle; the same material may behave differently in the system. The sane nonwoven composition can result in different swelling and interpenetration behavior depending on the resin system and cure profile.

The nonwoven microfibers may be constituted by bi or multicomponent fibers. Microfibers may have more complex structures such as sheath/core, side/side, pie segments, islands-in-a-sea and they may be made of different polymers or blends thereof. Polymer microfibers may contain organic or inorganic fillers or modifiers.

The surface of the nonwoven may be subject to a pretreatment such as a chemical treatment, a plasma treatment, a corona discharge treatment, a flame treatment, blasting or a combination thereof for the purpose of further improving or enhancing the adhesive strength and the mechanical interlocking mechanisms. However, this treatment is not needed to achieve high delamination strength and therefore, in some aspects treatment such as plasma treatment is not used due to the complex, expensive and potentially aggressive nature of such treatment. Mechanical or chemical treatments may damage the integrity of the microfibers and therefore modify the damping and thermo-mechanical behavior of the structure.

The term "interleaf" or "interlayer" as used herein has its ordinary meaning as known to those skilled in the art and includes a layer placed between other layers. In one embodiment, the interleaf may be positioned in the middle of a plane of a composite. In another embodiment, the mid-ply comprises the area of maximum shear. In a simple case shear and flexure can be determined by stress analysis of structure. For example, in the case of a beam loaded in flexure the area of maximum shear is at the neutral axis. In more complex structures additional calculations are required to determine the stress and to identify the area of maximum shear.

Each "interleaf" or "interlayer" may comprise a plurality of layers to form a single interlayer. The prepreg or composite structure may comprise more than one interlayer, but the interlayers are often separated by layers of structural material such as layers of textile used to form the composite structure. In some embodiments, the plurality of layers includes at least three layers such that a resin interpenetrated gradient in the z direction due the use of different compositions is formed upon curing. For example, an interlayer may comprise three layers, two that are more interpenetrated outer layers and a less interpenetrated core layer.

In some embodiments, a single layer may have a compositional gradient in the direction orthogonal to the reinforcing fibers such that a resin interpenetrated gradient in the z direction is formed upon curing. For example, the single layer can comprise a central portion characterized by a less interpenetrated core and more interpenetrated outer portions.

The term "compositional gradient" as used herein has its ordinary meaning as known to those skilled in the art and includes materials characterized by a progressive difference in composition from the core/central portion to the outer portions of their structure.

In another embodiment, the interleaf has a thickness of 20-2000 μm, preferably between 50-700 μm and most preferably between 100-300 μm.

The term "mid-plane" as used herein has its ordinary meaning as known to those skilled in the art and includes the portion in the middle of a ply of a composite that may be located at a distance of approximately 40 to 60% of the thickness of the composite from one or more surfaces of the composite.

The term "maximum shear" as used herein has its ordinary meaning as known to those skilled in the art and includes an internal force tangential to the section on which it acts resulting from applied forces that causes or tends to cause two contiguous layers to slide relatively to each other in the direction parallel to their plane of contact. The shear stress from bending is maximum on the midplane of the beam at the neutral axis. In some embodiments, the interleaf is positioned between layers of textile in the midplane of the integrated damped composite material, and in some aspects such positioning creates a more weight- and damping-efficient structure in areas selected on the level of shear.

In some embodiments, the interleaf may be placed in any layer constituting the composite structure, and in other embodiments the interleaf may be positioned in specific areas of the composites and in some aspects the interleaf may be positioned in areas selected on the level of shear to create more weight- and damping-efficient structure.

The term "embedded" as used herein has its ordinary meaning as known to those skilled in the art and includes an interleaf which is fully included within the composite structure. In some aspects, the interleaf is an integral part of the composite structure.

Elastomers are usually thermosets in which the long polymer chains cross-link during curing (vulcanization process). The elasticity is derived from the ability of the long chains to reconfigure themselves to distribute an applied stress. The covalent cross-linkages ensure that the elastomer will return to its original configuration when the stress is removed. As a result of this extreme flexibility, elastomers can reversibly extend from 5-800%, depending on the specific material. Without the cross-linkages or with short, uneasily reconfigured chains, the applied stress would result in a permanent deformation.

Thermoplastic elastomers (TPE) are a class of copolymers or a physical mix of polymers showing both thermoplastic and elastomeric properties. While most elastomers are thermosets, thermoplastics are in contrast relatively easy to use in manufacturing, for example, by injection molding and melt-blowing. Thermoplastic elastomers show both advantages typical of rubbery materials and plastic materials. The principal difference between thermoset elastomers and thermoplastic elastomers is the type of crosslinking. The crosslink in thermoset polymers is a covalent bond created during the vulcanization process. On the other hand the crosslink in thermoplastic elastomer polymers is a weaker dipole or hydrogen bond or takes place in only in one of the phases of the material.

The loss tangent (tan δ) is one of factors used for determining sound and vibration damping efficiency. Thus as the high damping nonwoven composition has a higher figure of the factor, a dynamic energy is absorbed and dissipated in the form of electric or thermal energy, and the interleaf exhibits an excellent mechanical characteristics such as acoustic absorbing properties, or vibration damping properties. A conventional high damping interleaf material composition is required to have a loss tangent higher than 1.0 and preferably between 1.5 and 2.0.

In addition, the interleaf composition may be chosen to ensure the suitability for nonwoven manufacturing processes, low moisture uptake and solvent and aggressive fluids resistance.

Embodiments of the interleaf described herein can be manufactured into various shapes having various features, such as fiber diameter, area/weight, thickness, air permeability and tensile properties. For example, the fiber diameter of the fiber in the composite may be about 10-20 μm, and in other embodiments 3-7 μm, 20-40 μm, or 40-60 μm. In addition, the mass per unit area of interleaf may be about 50-150 g/m$^2$, and in other embodiments 10-50 g/m$^2$, 150-300 g/m$^2$, or 300-500 g/m$^2$. Also, the thickness of the interleaf may be about 100-400 μm and in other embodiments 50-100 μm, 400-600 μm, or 600-1000 μm. The air permeability of the interleaf may be about 40-100 cc/cm$^2$/sec and 5 to 40 cc/cm$^2$/sec and in another embodiment 100 to 400 cc/cm$^2$/sec. For example, the tensile strength MD of the interleaf may be about 2-10 N/1.5 cm, and in other embodiments 10-20 N/1.5 cm, 20-60 N/1.5 cm, or 60-100 N/1.5 cm.

In one embodiment, the insertion of the interleaf in the composite laminate does not significantly affect the thermal properties ($T_g$), thermomechanical properties, or the environmental properties (moisture, solvent and aggressive fluids resistance) of the composite laminate. In another embodiment, the open hole compression and compression after impact strength properties are only slightly affected or not affected by the insertion of the interleaf in the composite laminate.

The term "layup" as used herein has its ordinary meaning as known to those skilled in the art and may include one or more prepregs that are placed adjacent one another. In certain embodiments, the prepregs within the layup may be positioned in a selected orientation with respect to one another. In a further embodiment, the prepregs may optionally be stitched together with a threading material in order to inhibit their relative motion from a selected orientation. In additional embodiments, "layups" may comprise any combination of fully impregnated prepregs, partially impregnated prepregs, and perforated prepregs as discussed herein. Layups may be manufactured by techniques that may include, but are not limited to, hand layup, automated tape layup (ATL), advanced fiber placement (AFP), and filament winding.

The terms "fuselage skin," "fuselage stringer" and "fuselage frame" as used herein have their ordinary meaning as known to those skilled in the art and refer respectively to the aircraft main body panels, the circumferential frames creating its skeleton and the longitudinal stiffening reinforcing members. The combination of frames and stringers is used to give fuselage vessel the required stiffness and the sufficient amount of material to sustain all aircraft loading both from a static and from a fatigue point of view. For the stringer elements in particular, the main purpose is to divide the skin panel surface in an optimal configuration so that deformation of the surface is avoided. The stringers also contribute to preventing cracks from spreading in the skin panel. Examples of fuselage frames include IST frames, floating C frames with shear ties and floating Z frames with shear ties.

The terms "organic modifiers," "organic fillers," "inorganic modifiers" and "inorganic fillers" as used herein have their ordinary meaning as known to those skilled in the art and may include organic and inorganic compounds such as flow control additives, UV absorbers, fillers such as silica, graphite and boron nitride, clays such as mica, talc, and vermiculite, metal particles, deglossing agents, pigments, antioxidants, flame retardants, diluents, stabilizers, monomers, prepolymers, flexibility improvers, processing aids and lubricants (including fluoropolymer-based processing aids, mineral oils and waxes), nucleating agents, fiber strands, polymers, glass, ceramic and polymeric bubbles, metal particles micro and nanofillers such as core-shell particles, magnetic and dielectric nanocrystals, carbon nanotubes, carbon nanofibers, nanographite, nanoclays, nanosilica, nanoalumina, zirconia and titania nanoparticles, noble metal nanoparticles, conductive micro and nanoparticles, nanofibers and nanostrands or a combination thereof added to a nonwoven material, usually to improve it properties.

Standard manufacturing processes for making composite materials may be used. For example, in one embodiment, the composite is made using a typical fuselage skin/frame manufacturing, process.

EXAMPLES

Example 1

Sample Preparation

Different material grades were selected to evaluate the effect of nonwoven layers composition, resin content, A/W, AP and distribution on composite structures.

A styrenic thermoplastic elastomer and in particular a copolymer containing hydrogenated ethylene-propylene flexible units (SEPS) and styrenic hard blocks, such as Kuraray Septon 2063 or Kraton FG1924X, was selected as main component for the nonwoven layers formulation. Different percentages of Polypropylene (PP) and of a high $T_m$, polyolefin (4 Methyl-1 Pentene copolymer) such as TPX DX231 or DX820 from Mitsui Chemicals, were compounded with the selected thermoplastic elastomer and then used to manufacture four nonwoven grades using a melt blowing process. A complete list is reported in Table 1.

TABLE 1

| Nonwovens composition, physical and mechanical properties | | | | | | |
|---|---|---|---|---|---|---|
| Nonwoven Code | Composition SEPS:PP:TPX | Veil weight (gsm) | Thickness (mm) | Air Permeability (cc/cm$^2$/s) | Tensile strength (N/1.5 cm) | Elongation (%) |
| 1 | 70:30:0 | 50 | 0.2 | 85.8 | 8 | 843 |
| 2 | 70:30:0 | 79 | 0.4 | 43 | 12 | 547 |
| 3 | 70:15:15 | 83 | 0.34 | 23 | 13 | 163 |
| 4 | 70:15:15 | 75 | 0.44 | 80 | 7 | 188 |

Two multilayer configurations, partially or totally pre-impregnated with CYCOM® 977-2 HM resin (FIG. 1), were chosen to study the effect of resin distribution and content (Configuration 1-5. Table 2) on the damping and mechanical properties of modified laminates.

TABLE 2

| Multi-veil configuration, stacking sequence and resin content | | | | |
|---|---|---|---|---|
| Multilayer Configuration | Structure | Nonwoven A | Nonwoven B | Resin content (gsm) |
| 1 | 1 | 3 | 2 | 74 |
| 2 | 1 | 3 | 3 | 74 |
| 3 | 2 | 3 | 1 | 74 |
| 4 | 2 | 3 | 2 | 74 |
| 5 | 2 | 3 | 3 | 74 |

Multilayer configurations 2 and 5 do not achieve the excellent results as achieved with Multilayer configuration 4 because the materials in both adjacent layers of the multilayer Structures 1 and 2 as illustrated in FIG. 1 are the same. Multilayer configuration 4 has a nonwoven core layer that differs from the nonwoven outer layers, which affects the properties of the composite material as discussed below in more detail. Thus, the type of nonwoven materials used, the sequence of the nonwovens in the interlayer, and the relative resin content in the layers affect the peculiar interlaminar morphology that may be achieved. If the peculiar structure in which a less permeable core is interconnected to more permeable outer layers is not present, the excellent damping and interlaminar strength properties may not be achieved.

Example 2

Dynamic Mechanical (DMA) and Microscopic Analyses

The damping efficiency of interleaved composite coupons was studied by carrying out a series of DMA multi-frequency (0.01 to 100 Hz) experiments in the range of temperatures between −50° C. and +20° C. at 10° C. intervals.

DMA test panels were manufactured from CYCOM® 977-2-34%-198-24K IMS unidirectional tape using a ply-by-ply lay-up method. Different pre-impregnated multilayer configurations (Table 2) were used as interleaf and laid-up at the mid plane of the specimen. For comparison purposes a specimen not containing any interleaf was manufactured and coded as "unmodified baseline". A complete list of the evaluated coupons is reported in Table 3.

TABLE 3

| Panels code and corresponding interleaf configuration | |
|---|---|
| Panels code | Interleaf |
| Unmodified baseline | No |
| Multi 1 | Multi-layer Configuration 1 |
| Multi 2 | Multi-layer Configuration 2 |
| Multi 3 | Multi-layer Configuration 3 |
| Multi 4 | Multi-layer Configuration 4 |
| Multi 5 | Multi-layer Configuration 5 |

Coupon dimensions are reported in Table 4.
Prior to test cured specimens were stored at (23±2° C.) and (50±5) % humidity.

TABLE 4

| DMA specimen dimensions | |
|---|---|
| Length | 40 ± 0.4 mm |
| Width | 10 ± 0.4 mm |
| Thickness | ~2 mm |
| Lay-up | Quasi-isotropic |

Figure 2:
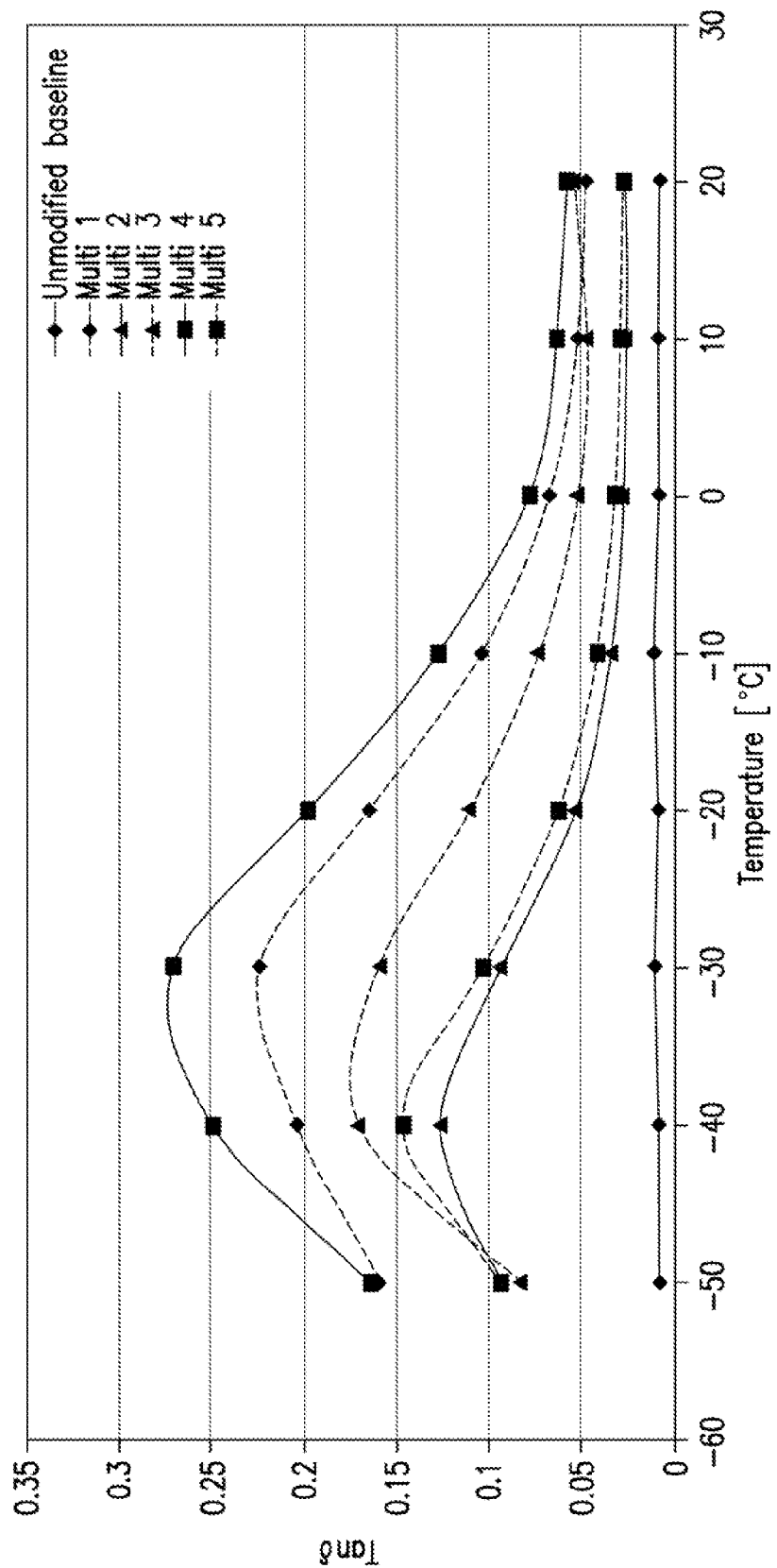
FIG. 2 is a graph comparing multi-veil modified composites, which illustrates the average loss factor in the 100-3000 Hz range as a function of temperature.

The magnitude of the applied stress and the resultant strain was used to calculate the stiffness and therefore the modulus of the material under stress. By measuring the time lag in the displacement compared to the applied force the damping properties of the material was determined. The time lag was reported as a phase lag (an angle). The damping is called tan δ, representing the tangent of the phase lag. Master curves were generated by elaborating data according to the WLF (Williams-Landel-Ferry) equation on the basis of TTS (Time Temperature Superimposition) principle. Average tan δ values in the frequency range between 100 and 3000 Hz were then plotted as function of temperature to compare the different material solutions performance (FIG. 2).

Excellent damping performance was achieved for all multilayer structures in the range of temperatures and frequencies evaluated. In particular, the configurations used in panels "Multi 1" and "Multi 4" delivered the best results, achieving tan δ values of up to 0.27 at −30° C.

The significant improvement is the result of the peculiar and controlled morphology created in the interlaminar region at the laminate mid plane.

Figure 3:
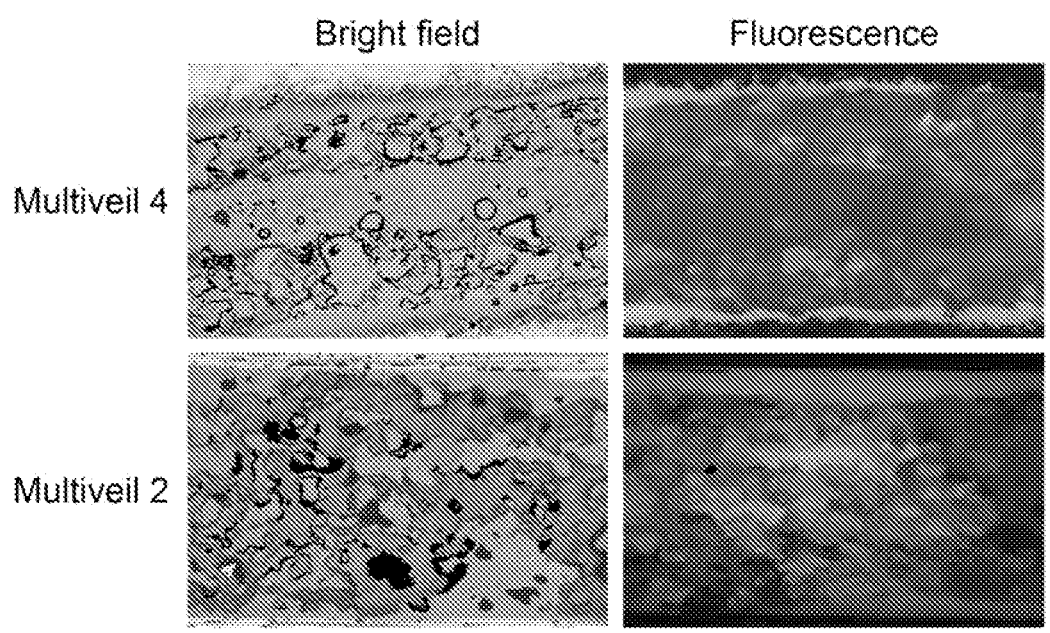
FIG. 3 show bright field and fluorescence microscopy of enlarged sections of the mid plane in multi-layer modified laminates.

By controlling the nonwoven composition, physical parameters and sequence, highly resin interpenetrated outer areas and less permeable core portions can be obtained as shown in FIG. 3. During the cure cycle the core layer creates an almost continuous network with the outer layers determining the peculiar veil/resin microstructure.

Conversely when much higher resin levels are achieved, the damping potential of the multilayer structure is reduced (Multi-layer Configuration 2 and 5).

Example 3

Interlaminar Shear Strength

The apparent shear strength of a specimen was tested in collection as a simple beam according to EN2563. A bar rests on two supports on the force applied by means of a loading nose midway between the supports and was measured in accordance with the following formula:

$$\tau = \frac{3 \times PR}{4 \times b \times h}$$

where:

$\tau$ is the apparent shear stress, in MPa

PR is the maximum force at the moment of the first failure, in N

B is the width of the specimen, in mm h is the thickness of the specimen, in mm

The apparent interlaminar shear strength of the multi-layer modified laminates was measured before and after MEK immersion. In the initial conditions specimens were conditioned according to EN 2743. For tests after MEK immersion, conditioning was carried out according to EN 2489.

Test panels were manufactured from CYCOM® 977-2-34%-198-24KIMS unidirectional tape. Multi-layer Configuration 4 (Table 2) was selected as interleaf for the example and laid-up at the mid plane of the specimens. Test specimens were taken in panels prepared according to EN2565. Specimen dimensions are reported in Table 5.

TABLE 5

| I.L.S.S. specimen dimensions | |
| --- | --- |
| Length (L) | 20 ± 0.25 mm |
| Width (w) | 10 ± 0.2 mm |
| Thickness (t) | 2 ± 0.2 mm |

The MethylEthylKetone conditioning did not affect the calculated apparent interlaminar strength of the specimens modified by the preferred multi-layer (Configuration 4). In particular in one embodiment the interlaminar shear strength was 69.24 MPa, and after the immersion for one hour in solvent was 69.14 MPa.

Example 4

Interlaminar Fracture Toughness—Mode I

Test panels were manufactured from CYCOM® 977-2-34%-198-24KIMS unidirectional tape according to EN2565. Multi-layer Configuration 2 and 4 (Table 2) were selected as interleaf and laid-up at the mid plane of the laminates.

Pre-cracked coupons were continuously loaded by peel-forces in a universal tester at 10 mm/min until a total propagated crack length of approximately 100 mm was achieved while load and test machine cross head displacement were continuously recorded.

$G_{ic}$ was calculated from the propagated crack length and the applied energy determined from the load-cross head displacement diagram and according to the following formula.

$$G_{ic} = \frac{A}{a \times w} \times 10^6$$

where:

PS is the peel strength

A is the energy to achieve the total propagated crack length a is the propagated crack length w is the width of the specimen Specimen dimensions are reported in Table 6.

TABLE 6

| $G_{ic}$ specimen dimensions | |
| --- | --- |
| Length (L) | 250.0 ± 5 mm |
| Initial crack length (l) | 25.0 ± 1 mm |
| Width (w) | 25.0 ± 0.2 mm |
| Thickness (t) | 3.0 ± 0.2 mm |

As shown in Table 7 the introduction of multi-layer configuration 2 resulted in minimal decrease in interlaminate strength if compared to the unmodified baseline. When the preferred multi-layer (configuration 4) is used to modify a composite laminate almost a 200% increase in strength can be achieved. Multilayer configuration four has a clear improvement in delamination strength in comparison to FIG. 11 of US Publication No. 2010/0170746. Such higher delamination strength values were achieved without the use of plasma treatment, which is an expensive and aggressive treatment, which potentially may have a detrimental effect with respect to other mechanical properties.

In both cases good resin interpenetration levels were achieved and cohesive failure modes were observed. The high $G_{ic}$ values can be explained on the basis of the additional energy dissipated into heat due to the selected interleaf architecture and to the peculiar interlaminar morphology obtained upon curing.

TABLE 7

| Interlaminar fracture - Mode I strength values | | |
| --- | --- | --- |
| Panel code | Interleaf | $G_{ic}$ [J/m²] |
| Unmodified Baseline | No | 344 |
| Multi 2 | Multi-layer Configuration 2 | 321 |
| Multi 4 | Multi-layer Configuration 4 | 949 |

Multilayer configuration 4 has significantly improved lamination strength in comparison to material illustrated in FIG. 11 of US Publication No. 2010/0170746.

Example 5

Interlaminar Fracture Toughness—Mode II

Test panels were manufactured from CYCOM® 977-2-34%-198-24KIMS unidirectional tape according to EN2565. Multi-layer configurations 2, 4 and 5 (Table 2) were laid-up at the mid plane of the laminate.

Test specimens were tested in dry/RT conditions and after being conditioned according to EN2743.

The precracked specimens were loaded in a three point bend fixture until crack propagation onset according to prEN 6034. The load applied to the specimen and the cross head displacement of the test machine are recorded continuously during the test. The total fracture toughness energy is calculated in accordance to the following formula:

$$G_{IIc} = \frac{9 \times P \times a^2 \times d \times 1000}{2 \times w \times \left(\frac{1}{4L^3} + 3a^2\right)}$$

where:
G is the fracture toughness energy [J/m2]
D is the crosshead displacement at crack delamination onset [mm]
P is the critical load to start the crack [N]
a is the initial crack length [mm]
w is the width of the specimen [mm]
L is the span length [mm]

TABLE 8

Interlaminar fracture toughness - Mode II strength values

| Panel code | Interleaf | $G_{IIc}$ [J/m²] |
|---|---|---|
| Unmodified Baseline | No | 911 |
| Multi 2 | Multi-layer Configuration 2 | 7479 |
| Multi 4 | Multi-layer Configuration 4 | 5505 |
| Multi 5 | Multi-layer Configuration 5 | 7118 |

The introduction of the selected interleaf solutions determined up to a 7 fold increase in the measured Giic values if compared to the unmodified baseline.

Example 6

Compression after Impact

The compression after impact test aims to determine the low speed impact resistance characteristics of composite laminates.

Multi-layer modified specimens were subject to impact at defined impact energy (30 J) and the compression strength is measured in accordance to EN 6038.

Test panels were manufactured from CYCOM® 977-2-34%-198-24KIMS unidirectional tape. The interleaf modified test panels were prepared in accordance with EN 2565 method B. Multi-layer configuration 4 (Table 2) was laid up at the mid-plane of the specimens. A quasi-isotropic lay-up and approximately 4 mm specimens were used for the test. Dimensions and tolerances are defined in Table 9.

The baseline and multi-layer modified specimens were impacted with 30 J energy and the dent depth measured. The ultrasonic scan was performed to determine the damage length, width and area.

The conditioning was carried out after impact. The test was performed at 23±2 mm 50±5% relative humidity.

A crosshead of 0.5 mm/min was selected. Load was continuously recorded as a function of time and the break failure load ($P_r$). The compression strength after impact at a specific impact energy level E is defined by the following formula:

$$\sigma_\tau = \frac{P_r}{w \cdot t}(MPa)$$

where:
$P_r$ is the break failure load (N)
w is the specimen width (mm)
t is the thickness of the specimen (mm)
The dimensions of the specimen are reported in Table 9:

TABLE 9

CAI specimen dimensions

| | |
|---|---|
| Length (L) | 150.0 ± 0.2 mm |
| Width (w) | 100.0 ± 0.2 mm |
| Thickness (t) | 4.0 mm |
| Lay-up | Quasi-isotropic |

The use of the preferred multi-layer configuration in the integrated composite structure resulted in a minimal drop in compression after impact strength while reducing in damage area if compared to the unmodified coupon.

TABLE 10

CAI strength and corresponding dent depth and damage area values after 30 J impact:

| Panel code | Interleaf | CAI strength [Mpa] | Dent depth [mm] | Damage area [mm²] |
|---|---|---|---|---|
| Unmodified Baseline | No | 226 | −0.16 | 1853 |
| Multi 4 | Multi-layer Configuration 4 | 197 | −0.19 | 1570 |

Example 7

Composite Loss Factor Measurements

Loss factor, $\acute{\eta}$, measurements were carried out according to ASTM E-756-05.

Specimens were forced to vibrate in a free-free configuration in an environmental chamber. Two types of transducers were used for the test: a shaker to apply an excitation force over a frequency range of 30 Hz to 10000 Hz; and several accelerometers to measure the response of the specimen to the applied force. By measuring several resonances of the vibrating specimen, the effect of frequency on the material's damping properties can be established. By operating the test fixture inside an environmental chamber over a range of −50±0.5° C. to +20±0.5° C. at 10° C. intervals, the effects of temperature on the material properties were investigated.

The output signals from the accelerometers were analyzed by a dual-channel fast Fourier transform spectrum analyzer. The analyzer determines the acceleration ratio and the phase difference of the two accelerometers, and also provides a random noise source to drive the shaker. The displayed amplitude ratio versus frequency results in a number of resonant peaks from which the modal loss factor was calculated by means of the half power bandwidth method.

Acoustic tests coupons were manufactured from CYCOM® 977-2-34%-198-24K IMS unidirectional tape according to EN2565 method B. Multi-veil configuration 4 (Table 2) was selected as interleaf for the example and laid up at the mid plane of the panel stacking sequence. For comparison purposes a specimen not containing any interleaf was manufactured and coded as "unmodified baseline."

Specimen dimensions are reported in Table 11.

Prior to test cured specimens were stored at (23±2)° C. and (50±5) % humidity. Specimens were conditioned at each temperature for at least 30 minutes before being tested.

TABLE 11

| Loss factor measurement specimen dimensions | |
|---|---|
| Length | 600 ± 1 mm |
| Width | 200 ± 1 mm |
| Thickness | ~165 mm |
| Lay-up | Quasi-isotropic |

As shown in Table 12 the disclosed multilayer integrated material specimen resulted in excellent acoustic damping performance in the temperature range between −50° C. and 20° C. and in the frequency range between 30 and 10000 Hz.

TABLE 12

| Average Loss factor loss as function of temperature | | | | | | | | |
|---|---|---|---|---|---|---|---|---|
| Frequency | $\eta$ (Loss factor) | | | | | | | |
| (Hz) | −50° C. | −40° C. | −30° C. | −20° C. | −10° C. | 0° C. | 10° C. | 20° C. |
| 30 | 0.0104 | 0.0179 | 0.0170 | 0.0150 | 0.0125 | 0.0139 | 0.0127 | 0.0149 |
| 50 | 0.0101 | 0.0185 | 0.0191 | 0.0170 | 0.0136 | 0.0151 | 0.0137 | 0.0153 |
| 75 | 0.0097 | 0.0194 | 0.0229 | 0.0197 | 0.0159 | 0.0166 | 0.0151 | 0.0163 |
| 100 | 0.0095 | 0.0190 | 0.0267 | 0.0234 | 0.0188 | 0.0177 | 0.0156 | 0.0163 |
| 150 | 0.0098 | 0.0193 | 0.0313 | 0.0322 | 0.0231 | 0.0184 | 0.0164 | 0.0162 |
| 200 | 0.0097 | 0.0202 | 0.0378 | 0.0412 | 0.0287 | 0.0190 | 0.0174 | 0.0160 |
| 250 | 0.0097 | 0.0211 | 0.0450 | 0.0505 | 0.0348 | 0.0196 | 0.0172 | 0.0158 |
| 300 | 0.0104 | 0.0216 | 0.0494 | 0.0595 | 0.0383 | 0.0207 | 0.0164 | 0.0150 |
| 350 | 0.0109 | 0.0232 | 0.0533 | 0.0668 | 0.0416 | 0.0230 | 0.0165 | 0.0147 |
| 400 | 0.0109 | 0.0243 | 0.0585 | 0.0652 | 0.0423 | 0.0269 | 0.0165 | 0.0152 |
| 500 | 0.0112 | 0.0258 | 0.0595 | 0.0642 | 0.0423 | 0.0312 | 0.0176 | 0.0159 |
| 600 | 0.0115 | 0.0277 | 0.0591 | 0.0628 | 0.0417 | 0.0350 | 0.0206 | 0.0172 |
| 650 | 0.0111 | 0.0297 | 0.0607 | 0.0631 | 0.0445 | 0.0376 | 0.0242 | 0.0187 |
| 700 | 0.0109 | 0.0310 | 0.0634 | 0.0639 | 0.0478 | 0.0403 | 0.0276 | 0.0202 |
| 800 | 0.0109 | 0.0335 | 0.0622 | 0.0689 | 0.0528 | 0.0402 | 0.0311 | 0.0216 |
| 900 | 0.0114 | 0.0350 | 0.0618 | 0.0717 | 0.0567 | 0.0418 | 0.0329 | 0.0228 |
| 1000 | 0.0126 | 0.0354 | 0.0607 | 0.0722 | 0.0603 | 0.0439 | 0.0338 | 0.0246 |
| 1250 | 0.0139 | 0.0354 | 0.0590 | 0.0670 | 0.0594 | 0.0470 | 0.0359 | 0.0286 |
| 1500 | 0.0155 | 0.0354 | 0.0528 | 0.0599 | 0.0562 | 0.0483 | 0.0390 | 0.0336 |
| 2000 | 0.0180 | 0.0329 | 0.0479 | 0.0504 | 0.0497 | 0.0510 | 0.0425 | 0.0385 |
| 2500 | 0.0202 | 0.0303 | 0.0170 | 0.0414 | 0.0432 | 0.0496 | 0.0467 | 0.0433 |
| 3000 | 0.0216 | 0.0277 | 0.0191 | 0.0150 | 0.0125 | 0.0461 | 0.0495 | 0.0463 |
| 4000 | 0.0233 | 0.0249 | 0.0229 | 0.0170 | 0.0136 | 0.0398 | 0.0490 | 0.0452 |
| 5000 | 0.0244 | 0.0217 | 0.0267 | 0.0197 | 0.0159 | 0.0340 | 0.0459 | 0.0415 |

The selected multi-veil solution ("multi-layer configuration 4" in Table 2) resulted in an average loss factor improvement of up to 600% if compared to the unmodified baseline.

Figure 4:
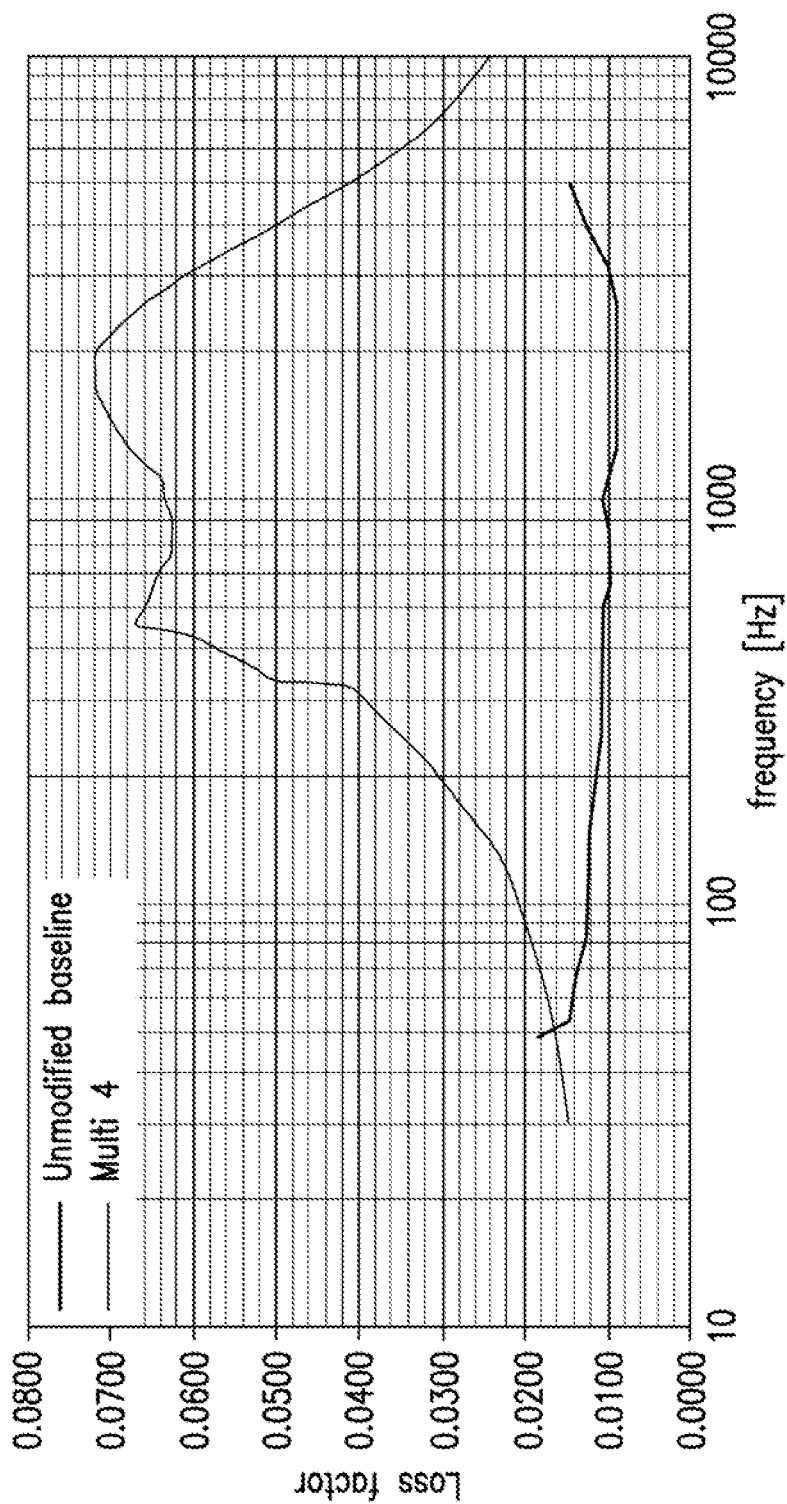
FIG. 4 is a graph illustrating the loss factor as function of frequency at −30° C.

As an example FIG. 4 shows the $\eta$ performance at −30° C. of a panel modified with multi-layer configuration 4 (Table 2) in the range between 30 and 5000 Hz. Excellent damping properties were obtained in the full spectrum of frequencies with peaks over 1000 Hz.

Example 8

Transmission Loss Analysis

Sound transmission loss measurements were carried out according to ASTM E-90 in two adjacent reverberation rooms according to the pressure method. Panels were framed and sealed on both sides and installed in correspondence to an opening between the rooms. A diffuse sound field was generated in the source room by a pink noise emitting source with flat spectrum in the frequency range 0-12800 Hz. Pressure levels in the one third octave bands belonging to the interval 250-10000 Hz were measured.

Acoustic tests coupons were manufactured from CYCOM® 977-2-34%-198-24K IMS unidirectional tape. The preferred multilayer structure (multi-layer configuration 4 in Table 2) was inserted as mid ply in the laminate stacking sequence and the stacking sequence cured at 180° C. for 3 hours. For comparison purposes a specimen not containing any interleaf was manufactured and coded as "unmodified baseline." Specimen dimensions and features are reported in Table 13.

TABLE 13

| Transmission loss specimen dimensions | | |
|---|---|---|
| | Multi-veil modified | Unmodified baseline |
| Length | 600 ± 1 mm | 600 ± 1 mm |
| Width | 200 ± 1 mm | 200 ± 1 mm |
| Thickness | ~1.45 mm | ~1.85 mm |
| Lay-up | Quasi-isotropic | Quasi-isotropic |

The total absorption was determined on the basis of the measurement of the reverberation time in the receiving chamber according to the following formula:

$$L_p TL = 10\log\frac{1}{\tau} = Lp_{source} - Lp_{recieving} + 10\log\frac{S}{A}$$

where:
$Lp_{source}$ is the space/time averaged sound pressure level in the source chamber [dB];
$Lp_{receiving}$ is the space/time averaged sound pressure level in the receiving chamber [dB];
S is the specimen surface area [m$^2$];
A is the total absorption in the receiving chamber with the test specimen in place [m$^2$].

A can be expressed as function of the time decay constant, in terms of the reverberation time of the receiving room measured with the test specimen installed, T60.

$$A = \frac{55.3 \times V_2}{c_{0} \times T_{60}}$$

As experimental results confirmed that the influence of the specimen on T60 is negligible above 500 Hz, the same correction factor was used to calculate the two panels TL.

Figure 5:
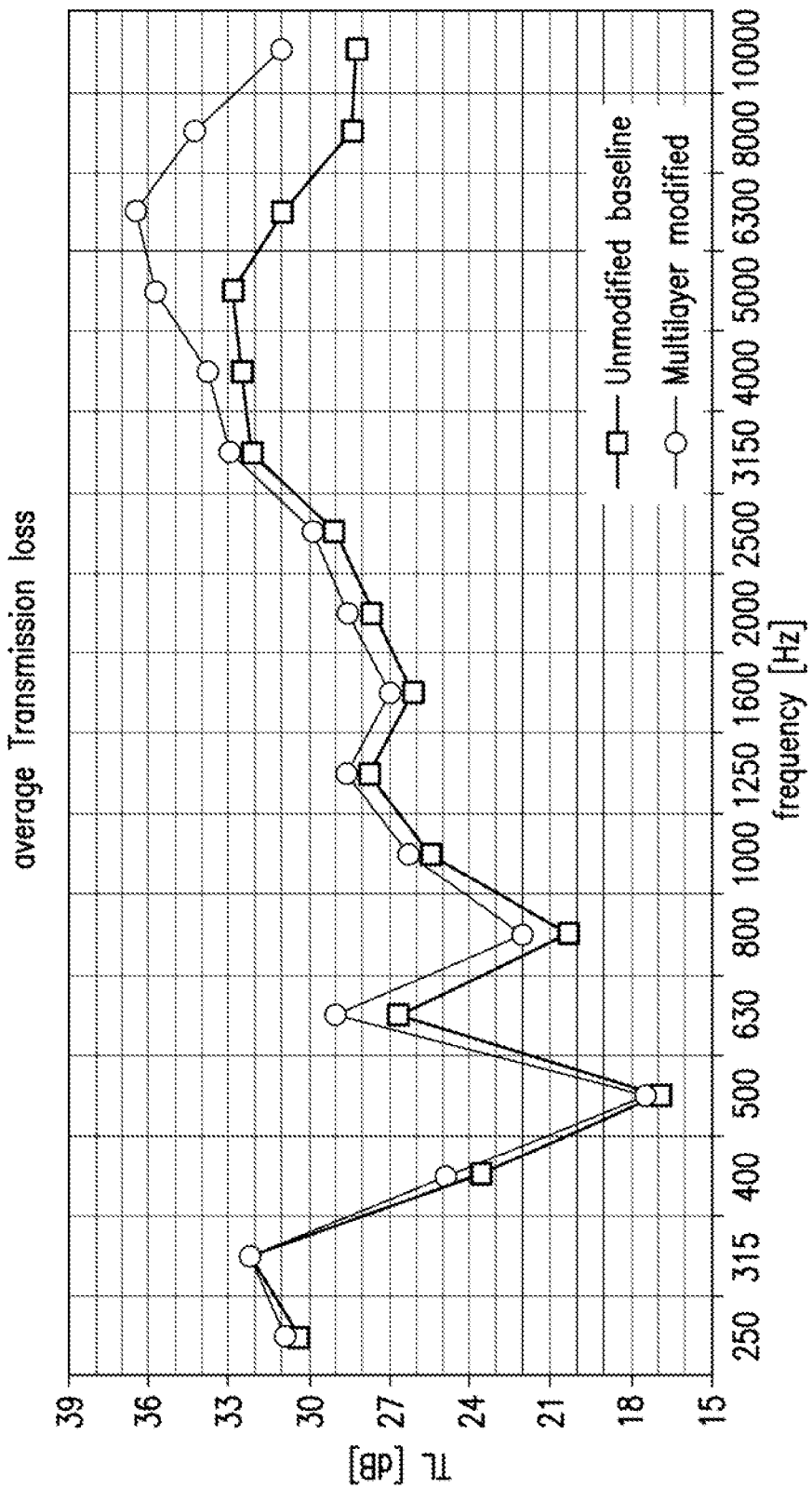
FIG. 5 is a graph illustrating the average transmission loss as function of frequency at 25° C.

As shown in FIG. 5, the panel modified with multi-layer configuration 4 (Table 2) showed excellent noise reduction performance in the frequency range between 630 and 10000 Hz. Specifically a noise reduction between 1 and 6 dB was observed. No change in performance was expected below this range of frequencies due to the testing facility geometry and dimension limitations.

What is claimed is:

1. An uncured structural composite material comprising a plurality of layers of structural fibers;
a thermoset resin component; and
an interlayer positioned between adjacent layers of structural fibers, the interlayer comprising at least two different types of nonwoven fibrous material, each nonwoven fibrous material comprising polymeric fibers,
wherein
the layers of structural fibers are impregnated with the thermoset resin component,
said at least two different types of nonwoven fibrous material comprises a first nonwoven fibrous material located in a core portion of the interlayer and a second nonwoven fibrous material located in outer portions of the interlayer that are on either side of the core portion,
the polymeric fibers of the first and second nonwoven fibrous materials are formed from a polymeric material comprising: (a) at least one thermoplastic elastomer, and (b) at least one thermoplastic polymer or copolymer thereof,
the interlayer comprises a compositional gradient in which the first nonwoven fibrous material in the core portion differs in composition from the second nonwoven fibrous material in the outer portions, and
the second nonwoven fibrous material is more permeable to the thermoset resin component than the first nonwoven fibrous material such that, upon curing, the interlayer comprises a resin interpenetration gradient in which the resin penetration in the outer portions of the interlayer is higher than that in the core portion.

2. The uncured structural composite material as in claim 1, wherein the first and second nonwoven fibrous materials are partially or totally pre-impregnated with the resin component before curing.

3. The uncured structural composite material as in claim 1, wherein the thermoset resin component comprises epoxy resin or bismaleimide.

4. The uncured structural composite material as in claim 1, wherein the structural fibers comprise carbon fibers.

5. The uncured structural composite material as in claim 1, wherein the at least two different types of nonwoven fibrous material are embedded in the thermoset resin component prior to curing.

6. The uncured structural composite material as in claim 1, wherein the thermoplastic elastomer is selected from the group consisting of styrenic thermoplastic elastomers, polyolefin based thermoplastic elastomers, and a blend thereof.

7. The uncured structural composite material as in claim 6, wherein the thermoplastic polymer is selected from the group consisting of polyesters, polyamides, and polyolefins.

8. The uncured structural composite material as in claim 1, wherein the interlayer further comprises organic or inorganic fillers.

9. An uncured composite sandwich structural material comprising:
a first skin and a second skin, wherein the first skin and the second skin comprise a plurality of layers of textile impregnated with a thermoset resin;
a structural core between the first skin and the second skin; and
an interleaf between one skin and the structural core, wherein
the interleaf comprises at least two different types of nonwoven fibrous material, each nonwoven fibrous material comprising polymeric fibers,
said at least two different types of nonwoven fibrous material comprises a first nonwoven fibrous material located in a core portion of the interleaf and a second nonwoven fibrous material located in outer portions of the interleaf that are on either side of the core portion,
the polymeric fibers of the first and second nonwoven fibrous materials are formed from a polymeric material comprising: (a) at least one thermoplastic elastomer, and (b) at least one thermoplastic polymer or copolymer thereof, and
the interleaf comprises a compositional gradient in which the first nonwoven fibrous material in the core portion differs in composition from the second nonwoven fibrous material in the outer portions, and
upon curing, the interleaf comprises a resin interpenetration gradient between the nonwoven material in the core and outer portions in the z direction.

10. The uncured composite sandwich structural material of claim 9, wherein the thermoplastic elastomer is selected from the group consisting of styrenic thermoplastic elastomers, polyolefin based thermoplastic elastomers and a blend thereof.

11. The uncured composite sandwich structural material of claim 9, wherein the thermoplastic polymer is selected from the group consisting of polyesters, polyamides, and polyolefins.

12. The cured or uncured composite sandwich structural material of claim 9, wherein the interleaf further comprises organic or inorganic fillers.

13. The cured or uncured composite sandwich structural material of claim 9, wherein the thermoset resin comprises an epoxy resin or bismaleimide and the textile comprises carbon fibers.

* * * * *